(12) United States Patent
Carter et al.

(10) Patent No.: US 9,870,166 B2
(45) Date of Patent: Jan. 16, 2018

(54) SECURELY SHARING CACHED DATA

(71) Applicant: Apple Inc., Cupertino, CA (US)

(72) Inventors: David A. Carter, Cupertino, CA (US); Keith Stattenfield, Cupertino, CA (US); David P. Remahl, Jr., Cupertino, CA (US); Christopher S. Linn, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 512 days.

(21) Appl. No.: 14/486,999

(22) Filed: Sep. 15, 2014

(65) Prior Publication Data

US 2016/0077758 A1    Mar. 17, 2016

(51) Int. Cl.
  *G06F 3/06*      (2006.01)
  *G06F 12/0875*   (2016.01)
  *G06F 17/30*     (2006.01)

(52) U.S. Cl.
  CPC .......... *G06F 3/0623* (2013.01); *G06F 3/0643* (2013.01); *G06F 3/0656* (2013.01); *G06F 3/0674* (2013.01); *G06F 12/0875* (2013.01); *G06F 17/3028* (2013.01); *G06F 17/30132* (2013.01); *G06F 2212/1052* (2013.01); *G06F 2212/281* (2013.01); *G06F 2212/455* (2013.01)

(58) Field of Classification Search
  CPC .... G06F 3/0623; G06F 3/0643; G06F 3/0656; G06F 3/0674; G06F 12/0875; G06F 17/30132; G06F 17/3028
  USPC .... 711/118, 6, 154, 156, 158, 202; 715/762, 715/763, 772, 859
  See application file for complete search history.

(56) References Cited

U.S. PATENT DOCUMENTS

| | | | |
|---|---|---|---|
| 6,269,446 B1 * | 7/2001 | Schumacher | H04N 1/32128 380/30 |
| 6,269,466 B1 * | 7/2001 | Crafts | H01L 27/0207 257/E27.108 |
| 6,389,460 B1 | 5/2002 | Stewart et al. | |
| 6,529,590 B1 * | 3/2003 | Centers | F04B 49/065 340/679 |
| 6,901,433 B2 | 5/2005 | San Andres et al. | |
| 7,216,304 B1 | 5/2007 | Gourdol et al. | |
| 7,477,235 B2 * | 1/2009 | Usuda | G06F 3/0485 345/156 |
| 7,752,447 B2 * | 7/2010 | Kazami | G11B 20/00086 380/201 |
| 7,853,760 B2 * | 12/2010 | Paladini | G06F 12/08 710/56 |
| 8,046,328 B2 | 10/2011 | Rhodes et al. | |
| 8,316,321 B2 | 11/2012 | Ording et al. | |
| 8,516,038 B2 | 8/2013 | Jalon et al. | |

(Continued)

*Primary Examiner* — Stephen Elmore
(74) *Attorney, Agent, or Firm* — Blakely, Sokoloff, Taylor & Zafmann LLP (57) ABSTRACT

Various embodiments of a system and method for securely caching and sharing image data. A process can generate image data and store the image data into the protected cache using a UUID that is cryptographically derived from the image data. Any process with access to the UUID may retrieve the image data. Because the UUID is uniquely derived from the actual data of the generated file, a process will only be able to retrieve image data that could have been generated by a process associated with the user account, or from a process associated with a user account that could have generated the image data, or that otherwise has a record of the image data.

19 Claims, 8 Drawing Sheets

(56) References Cited

U.S. PATENT DOCUMENTS

| | | |
|---|---|---|
| 8,677,092 B2 | 3/2014 | Ramezani |
| 2011/0047496 A1* | 2/2011 | Harrison ............... G06F 11/328 |
| | | 715/772 |

* cited by examiner

SECURELY SHARING CACHED DATA

BACKGROUND OF THE DISCLOSURE

Generating a graphical user interface for a data processing system may make extensive use of image data. For example, systems may be configured to display image data to create a desktop or display background. Image data can also be used as graphical icons and configured to represent various elements of the user interface. In particular, graphical icons may be used to represent disks, documents, and computer applications that may be executed by the data processing system. The images used within the graphical user interface may be simple images or may be a composition of multiple images. For example, icon images displayed on the user interface may be a composite of a basic icon images and several other images that are used to represent, for example, a current state of the file or application.

The resources used to generate the images may become significant over time in systems where a large number of images are displayed. For example, in multi-user systems the generated data may consume a large amount of storage space. Each user may require a subset of all possible images used by the user interface. The image data for each user should be private to the user for security and privacy purposes, as it may be possible to infer information about the system configuration for a given user based on the subset of images used. To maintain the privacy and security of generated image data, each user may cache the generated images privately. However, maintaining multiple private caches may result in a significant amount of duplicate data.

SUMMARY OF THE DESCRIPTION

In this summary and the description that follows, references to "one embodiment" or "an embodiment" indicate that a particular feature, structure, or characteristic described in conjunction with the embodiment can be included in at least one embodiment of the invention. The appearances of the phrase "in one embodiment" in various places in the specification do not necessarily all refer to the same embodiment.

Disclosed herein are various embodiments of a system and method for securely sharing cached data between multiple users on a data processing system. In one embodiment, a method of caching image data for a user interface of a data processing system includes rendering the image data into memory of the data processing system, computing a digest of the image data, and storing the image data in a protected image data cache using a unique identifier based on the digest of the image data.

In one embodiment, a non-transitory machine readable storage medium stores instructions which, when executed by one or more processors, cause the one or more processors to perform operations comprising creating a virtual memory buffer to store generated image data, computing a digest of the generated image data stored in the virtual memory buffer, sharing the image data with a process in response to a request for the image data, checking an image data cache for image data having a unique identifier of the generated image data, and remapping the virtual memory buffer to a location in the image data cache associated with the unique identifier.

In one embodiment, a system comprises one or more processors coupled to memory, one or more storage devices to store a protected image data cache, and an operating system executing on the one or more processors, the operating system including a virtual memory system to map a location on the one or more storage devices to an address in the memory. A first process and a second process are configured to execute on the one or more processes via the operating system. The first process and the second process each access the same composited image data stored in the protected image data cache using a unique identifier derived from the image data. Access is provided at least in part by a mapping from a virtual memory system provided by the operating system. The virtual memory system is configured to map a location on the one or more storage devices to an address in the memory.

The above summary does not include an exhaustive list of all aspects of the various embodiments and other features will be apparent from the accompanying drawings and from the detailed description. It is contemplated that the invention includes all systems and methods that can be practiced from all suitable combinations of the various embodiments summarized above, and also those disclosed in the Detailed Description below.

BRIEF DESCRIPTION OF THE DRAWINGS

The present invention is illustrated by way of example, and not limitation. In other words, the associated drawings are to be considered illustrative of the embodiments, but are not to be construed as limiting. In the figures of the accompanying drawings, like references indicate similar elements.

Embodiments will be described with reference to details discussed below and the accompanying drawings will illustrate the various embodiments.

DETAILED DESCRIPTION

A portion of the disclosure of this patent document contains material that is subject to copyright protection, such as images of graphical user interface elements. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2014.

In on embodiment, multiple processes associated with multiple user accounts may access image data stored in secure cache using a UUID derived from a message digest of the image data. Because the UUID is uniquely derived from the actual data of the generated file, a process will only be able to retrieve image data that could have been generated by a process associated with the user account, or from a process associated with a user account that could have generated the image data, or that otherwise has a record of the image data.

In one embodiment, a system is configured to generate image data for a user and store the image data in a private cache using a UUID. The UUID can be derived from a digest of the image data generated using a message digest algorithm. In the event multiple users generate identical image data, the generated image data will have the same digest, and thus the same UUID, allowing both users to access to the image data from the image data cache without requiring duplicate copies of the data.

The various embodiments are described in the context of methodologies implemented at least in part in the operating system ("OS") of a computing device or data processing system. Numerous specific details are described to provide a thorough understanding of various embodiments. However, certain well-known or conventional details are not described so as to provide a concise description.

Figure 1:
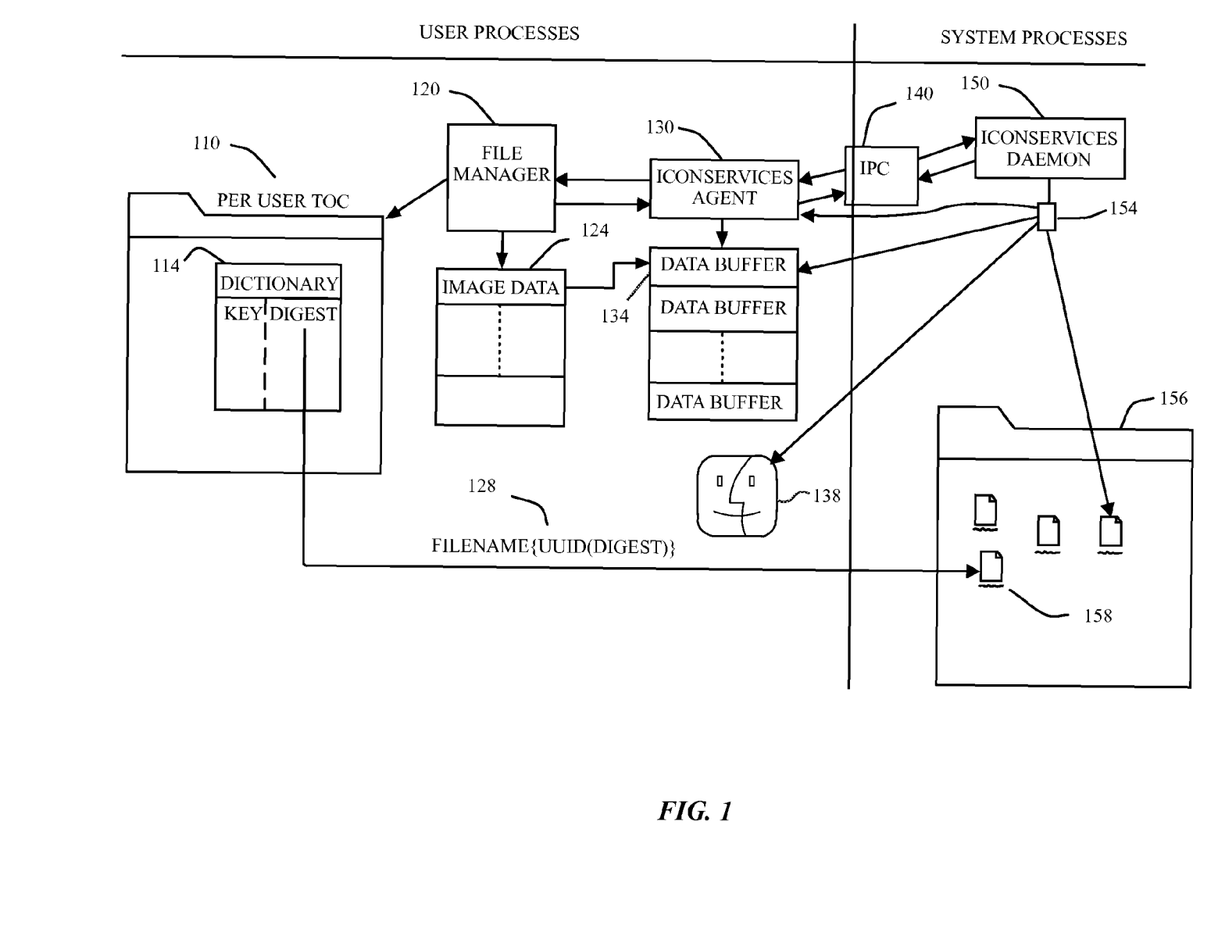
FIG. 1 is a block diagram of an embodiment of a system to generate and securely share cached data.

FIG. 1 is a block diagram of an embodiment of a system to generate and securely share cached data. The system includes a set of user processes including a table of contents (TOC) 110, a file manager 120, and an icon services agent 130. The TOC 110 can include at least one dictionary 114, which can be a key-value store that stores keys and metadata values associated with each key. The TOC 110 can be used to store metadata for the file manager 120. The file manager 120 allows a user of the system to manage files, disks, network volumes, attached drives, or other file and system components. The file manager 120 also provides an interface to enable a user to launch applications. In some data processing system operating systems, the file manager 120 defines or influences the overall graphical user interface presented to users of the system. Exemplary file managers include the Finder program on Macintosh computers from Apple Inc. of Cupertino, Calif. The file manager 120 can present icons (e.g., icon 138) to visually represent files, applications, or other system components. The system can allow a user to adjust the size of icons based on user preference or based on a characteristic of the objects represented by the icons.

The system can be configured to generate icons, as well as other images used as graphical user interface elements, and store the generated images in the image data cache of the icon services store using, for example, the icon services agent 130 and icon services daemon 150. The icon services agent 130 is a process associated with the user account to facilitate the creation and management of icon image data. An inter process communication (IPC) service 140 enables communication between the icon services agent 130 user process and a system managed icon services daemon 150. In one embodiment, the IPC service 140 is a system provided service that is used specifically to enable communication between the icon services agent 130 and the icon services daemon 150.

The icon services daemon 150 can be used to access a protected image data cache 156. The protected image data cache 156 can be used as a cache for image data generated for the user interface. In one embodiment the protected image data cache 156 allows multiple processes associated with multiple user accounts to access image data stored in secure cache. The image data is accessed using a UUID 128 derived from a message digest of the image data. The UUID 128 is uniquely derived (e.g., deterministically, cryptographically, etc.) from the message digest of the image data. Therefore, a process will only be able to retrieve image data that could have been generated by a process associated with the user account, or from a process associated with a user account that could have generated the image data, or that otherwise has a record of the image data.

In one embodiment the protected image data cache 156 is implemented as a file system directory on a data storage device of the data processing system. Individual units of image data can be stored as individual files (e.g., file 158) in the directory. In such embodiment, ownership for the image data cache 156 can be set to a system provided restricted user account. The restricted user account can be associated with the icon services daemon 150 and the protected image data cache 156. Only the restricted user, via the icon services daemon 150, has write access to the file system directory. The file system permissions for the image data cache 156 are configured to prevent standard user processes from enumerating the contents of the directory. Preventing directory enumeration prevents the standard user processes for determining the contents of the cache.

The protected image data cache 156 can be used to store composite images generated for use as icons. In one embodiment, icons (e.g., icon 138) can be a multi-image composite of several images that are combined using one or more alpha blending techniques, although support may be provided for simple icon images. For composite images the icon services agent 130 may request a graphics processing component of the data processing system to perform rendering operations including combining and blending the several images into a composite image.

Composite image icons can be used provide information to a user related to the object the icon represents. For example, the file manager 120 can place a "lock" badge on files and folders that are locked, or place a "no entry" badge on folders that are not accessible. Other badges may be used to convey other hints about the status of a file or folder. The composite image can be rendered in one of several formats. In one embodiment the image is rendered as a 32-bit uncompressed bitmapped image (e.g., pixmap) having 8-bits per red, green, and blue channel and an 8-bit alpha channel, although other image formats or color depths may be used. Additional information on composite image icons can be found in U.S. Pat. No. 8,516,038 granted Aug. 20, 2013, which is hereby incorporated by reference.

When a process on the data processing system, such as the file manager 120, is to draw an icon (e.g., icon 138), the process may look to the dictionary 114 in the TOC 110 to retrieve image data 124 associated with the icon. For each type of icon the file manager 120 process is aware of (e.g., file, folder, application, etc.) a digest of the image data for the icon can be stored in the dictionary as a value associated with a key. The key may be deterministically derived for the icon image data based on certain metadata associated with the image data for the icon or the file that the icon is to represent.

For example, image data for an icon associated with a first set of folders, folder types, files, or file types can be indexed under a first key while data for an icon associated with a second set of folders, folder types, files, file types, applications, or any other object displayed as a UI element can be indexed under a second key. Additional permutations of those icons such as icons for locked files, running applications, or open files can also be stored under separate keys in the dictionary. Icon image data having certain effects applied based on the state of the file in the user interface (e.g., when a file or folder is selected) may also be indexed under a separate key. As each key indexes a separate image, the same icon image in differing resolutions can also be stored under separate keys. In each case, the file manager 120 can use metadata associated with the icon or the object represented by the icon to derive the key associated with the image data to be drawn.

If the file manager 120 finds an entry in the dictionary 114 of the TOC 110 using the derived key associated with the desired icon, the file manager 120 can retrieve a digest associated with the key from the dictionary 114. The digest can be used to derive a UUID 128 for the image data. The UUID 128 is used to store the image data in the protected image 9 data cache 156. The file manager 120 can then retrieve the data in the stored data using the UUID 128.

If there is no entry in the dictionary 114 for the key, the file manager 120 can send a request to the icon services agent 130 associated with the user account. If the icon services agent 130 for the user is aware of icon image data associated with the requested key, the icon services agent 130 can make a data buffer 134 containing the image data available to the file manager 120. The file manager 120 can then map (e.g., using a virtual memory manager) the data buffer 134 into the file manager's process space, or otherwise retrieve the image data from the icon services agent 130. The file manager can then compute a digest of the image data 124 and store the digest in the appropriate dictionary 114 of the TOC 110 for later use. Once the file manager 120 is aware of the digest associated with a derived key, the file manager 120 may access icon data without the intervention of the icon services agent 130.

The icon services agent 130 will not have a record of the icon image data 124 unless at least some other process owned by the user has previously generated the icon image data. When a process of a user account first requests icon image data, the icon image data 124 is generated from one or more images retrieved from an icon store, such as in a package associated with an application or from an icon file. The icon services agent 130 creates a data buffer 134 to store the generated icon image data. The icon services agent 130 can then cause the data processing system to render the icon image into the data buffer 134 by composing one or more images into a single image.

Subsequently, the icon services agent 130 can generate a digest of the contents of the memory buffer using a message digest algorithm. Subsequently, a UUID 128 for the image data can be generated based on the digest of the image data. The UUID 128 can be deterministically derived from the digest of the image data or cryptographically derived from the digest of the image data. Because generating the UUID 128 requires access to the image data, the process may only access the image data if the user account associated with the process has previously generated the image data or received the UUID 128 from a user account or process that has previously generated the image data. In one embodiment a variant of the UUID 128 is used to derive a filename for the file 158 in the image data cache 156.

In one embodiment, to avoid delaying any pending draw operations requested by the file manager 120, the icon services agent shares the data buffer 134 containing the image data to the file manager before causing the image data 124 for the icon 138 to be stored, as the IPC 140 service used in the process of storing the data buffer 134 to the file 158 may inject a longer delay than acceptable when draw operations are pending. After the data is stored to the file 158, the icon services agent 130 may transparently re-map the data buffer 134 containing the image data 124 to the file 158 in the image data cache 156 and recycle the memory object that was previously backing the previously anonymous (e.g., not file backed) virtual memory data buffer 134.

In one embodiment the icon services agent may query the protected image data cache 156 using the UUID 128 before attempting to store the newly generated data in the data buffer 134 to determine if an instance of the image data has been previously created by a different user account. If a file matching the UUID 128 of the data does not exist in the cache, the icon services agent 130 can send a message via the IPC service 140 to cause the data buffer 134 to be stored to the image data cache 156.

In one embodiment, the icon services agent 130 is associated with a standard user account and does not have write access to the image data cache 156. To store the image data, the icon services agent can use the IPC service 140 to send a message to the icon services daemon 150 with a request to store the newly created image data 124.

In one embodiment image data is immutable once added to the image data cache and cannot be changed. In such embodiment, the icon services daemon 150 can include logic to disallow a write or modification to existing files in the directory containing the image data cache 156. In one embodiment, file modification is preventing by allowing the icon services daemon 150 to write new files to the image data cache directory but disallowing the modification or deletion of existing files. As additional security the IPC service 140 used to communicate between the icon services agent 130 and the icon services daemon 150 may be dedicated and specific to icon services processes and other user processes (e.g., standard user processes) are prevented from communicating with the icon services daemon via the IPC service 140.

Exemplary process methodologies associated with the embodiments of the system shown in FIG. 1 are described in FIG. 2, FIG. 3, and FIG. 4 below. The processes depicted in these figures are performed by processing logic that comprises hardware (e.g. circuitry, dedicated logic), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

Figure 2:
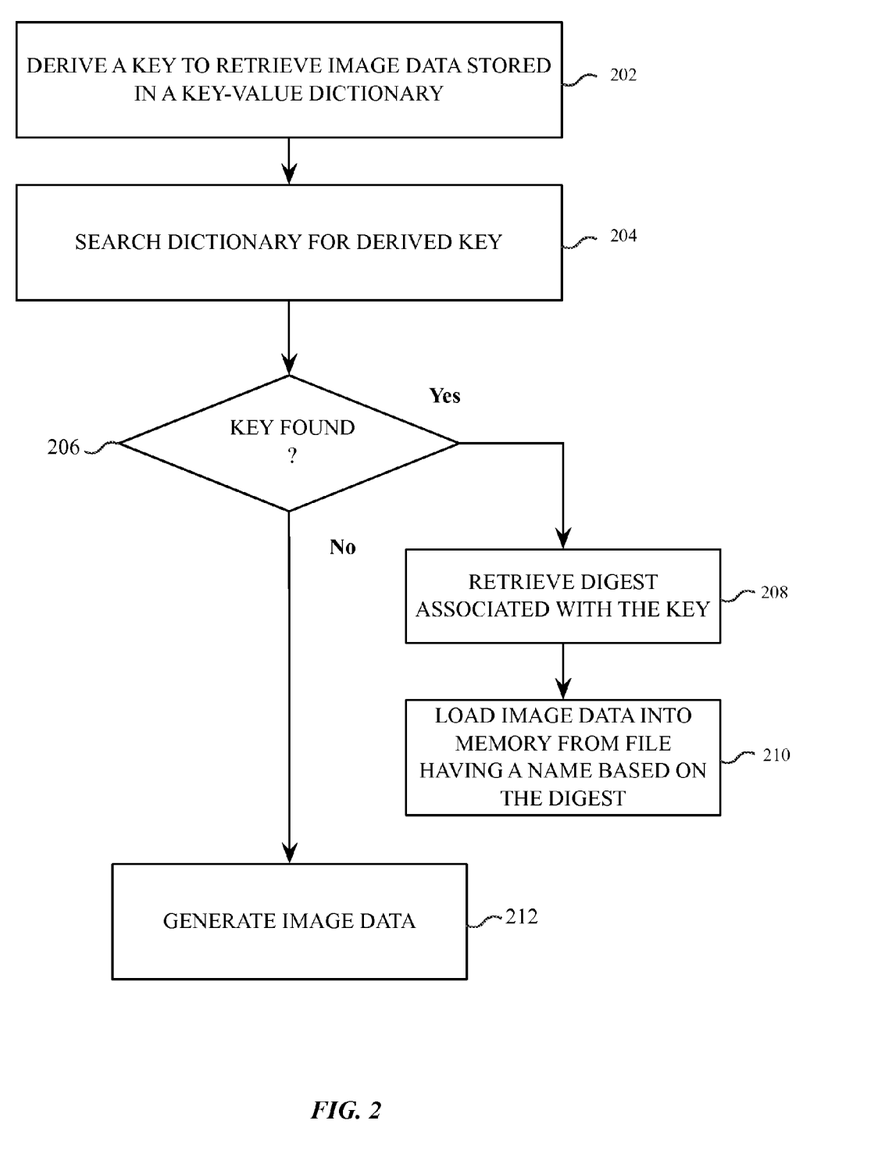
FIG. 2 is a flow diagram of logic to retrieve image data from a protected image data cache, according to an embodiment.

FIG. 2 is a flow diagram of logic to retrieve image data from a protected image data cache, according to an embodiment. In one embodiment, a process associated with a user on the data processing system can retrieve image data, such as icon image data, from a protected image data cache (e.g., image data cache 156 of FIG. 1). As shown at block 202, the process can derive a key to retrieve the icon data based on metadata associated with the icon or the object represented by the icon. The process can then search a dictionary, such as a key-value store, for a value associated with the key, as shown at block 204. If the key is found in the dictionary at block 206, then the process can retrieve the value associated with the key, which in one embodiment is a digest of the image data, as shown at block 208.

As shown at block 210, the process can then retrieve the image data by using the digest as a UUID. The UUID can be used as, or used to derive the filename of the file containing the image data. The process can then load the image data in memory to use, for example, as image data for an icon, or another graphical user interface element. In one embodiment, the process loads the image data by creating a virtual memory buffer in memory that is backed by the file having the image data. Thus, when the image data is required to perform a draw operation, the image data stored in the file will be automatically loaded into memory by a virtual memory manager of the data processing system.

Returning to block 206, if the key derived at block 202 is not found after a search of the dictionary at block 204, the process can proceed to block 212 and generate the image data associated with the derived key. In one embodiment the process can generate the image data with the assistance of an icon services agent, which is a system provided process that is associated with the user account of the process and assists processes in the generation and management if icon image data.

Figure 3:
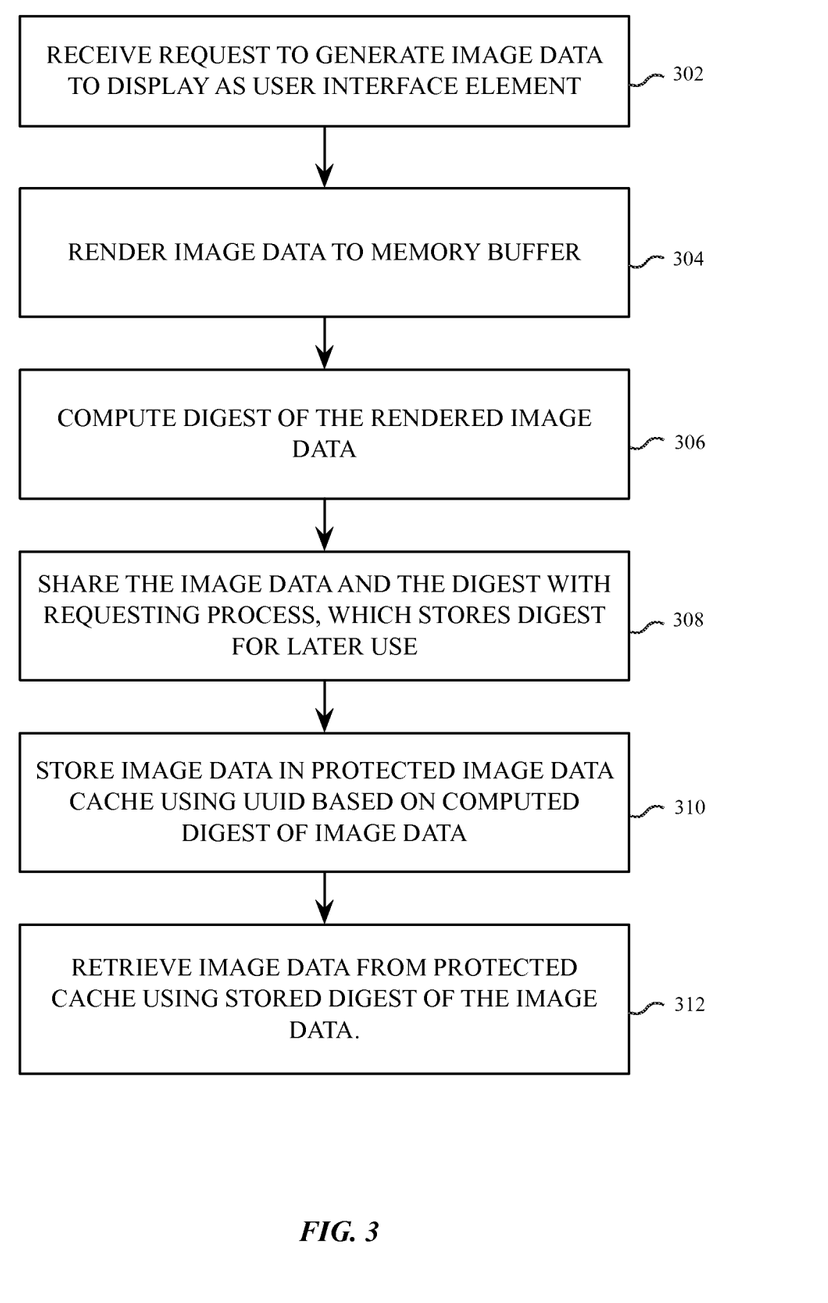
FIG. 3 is a flow diagram of logic to generate and store image data for the user interface of the data processing system, according to an embodiment.

FIG. 3 is a flow diagram of logic to generate and store image data for the user interface of the data processing system, according to an embodiment. In one embodiment a system provided agent process associated with a user account, such as the icon services agent 130 of FIG. 1) can assist other user processes (e.g., file manager 120 of FIG. 1) in generating image data (e.g., as in block 212 of FIG. 2). Accordingly, FIG. 3 will be discussed with reference to the file manager 120, icon services agent 130, and icon services daemon 150 of FIG. 1. However, such references are exemplary and not intended to be limiting, as similar processes in analogous data processing systems can also perform the operations described.

As shown at block 302, an icon services agent, or other support agent associated with the user account, can receive a request from a process to generate image data for an icon to display as a user interface element. The requesting process can be the file manager process, which will display the image data as an icon to represent an object managed by the file manager. At block 304 the image data is rendered into a memory buffer. The icon services agent can create the memory buffer or the requesting process can create the buffer. The memory buffer may be created using any number of memory management or memory allocation techniques.

Once the image data is rendered or otherwise generated the icon services agent can compute a digest of the rendered image data using a message digest algorithm, which is a cryptographic hash algorithm used to process an arbitrary-length message into a fixed-length output. Exemplary message digest algorithms include the MD5 algorithm or the SHA (e.g., SHA-1, SHA-2) secure hash algorithms. In one embodiment, the memory buffer contains only the rendered image data, without any additional data or metadata. Accordingly, computing the digest of the image data can include computing a cryptographic hash of the contents of the memory buffer containing the image data.

As shown at block 308, the image data and the computed digest can be shared with the requesting process of block 302, which can store the digest for later use. For example, the icon services agent, having generated the image data and computed the digest, can provide the digest to the file manager process, which previously requested the image data. The file manager process can then store the digest in a key value store using a previously derived associated with the icon for which the image data will be used.

Alternatively, the icon services agent may provide the image data to the file manager process and the file manager process may derive the digest for the image data before storing the digest for later use. In one embodiment, sharing the memory buffer and the digest with the requesting process includes mapping a virtual memory buffer containing the image data into the process memory space of the file manager. At this point, the virtual memory buffer may be an anonymous virtual memory buffer that exists only in system memory or in a backing store of the virtual memory system.

As shown at block 310, the generated image data can be stored in the protected cache using a UUID. The image data cache can be owned by a restricted user account with limited access to the data processing system. In one embodiment the restricted user account cannot log in as an active user and does not have a home directory. However, the restricted user account has write access to the protected image data cache, while other user accounts are presented with read-only access.

In one embodiment the icon services daemon is associated with the restricted user account that owns the protected image data cache, allowing the icon services daemon to write to the cache. The icon services agent can use an IPC service to request the icon services daemon to store the generated image data to a file. The icon services daemon can then store the data in the cache using the UUID of the image data.

In one embodiment, the image data is stored by copying the image data into virtual memory buffer that is mapped to an address in the protected image data cache. Once the image data is stored, the icon services agent transparently remaps the memory shared with the file manager process at block 308 to a virtual memory buffer that is mapped to the data stored in the image data cache. The virtual memory pages previously backing the shared memory buffer may then be released or recycled for other uses. In one embodiment image data is immutable once the data is stored in the protected image data cache.

While, at block 308, the generated image data was shared with the requesting process, the requesting process may subsequently use the stored digest of the image data to retrieve the image data from the protected image data cache without requiring the intervention of the icon services agent. As shown at block 312, the process can retrieve the image data from the protected cache using the stored digest. The stored digest can be used to derive the UUID of the image data and retrieve the image data from the protected image data cache.

Figure 4:
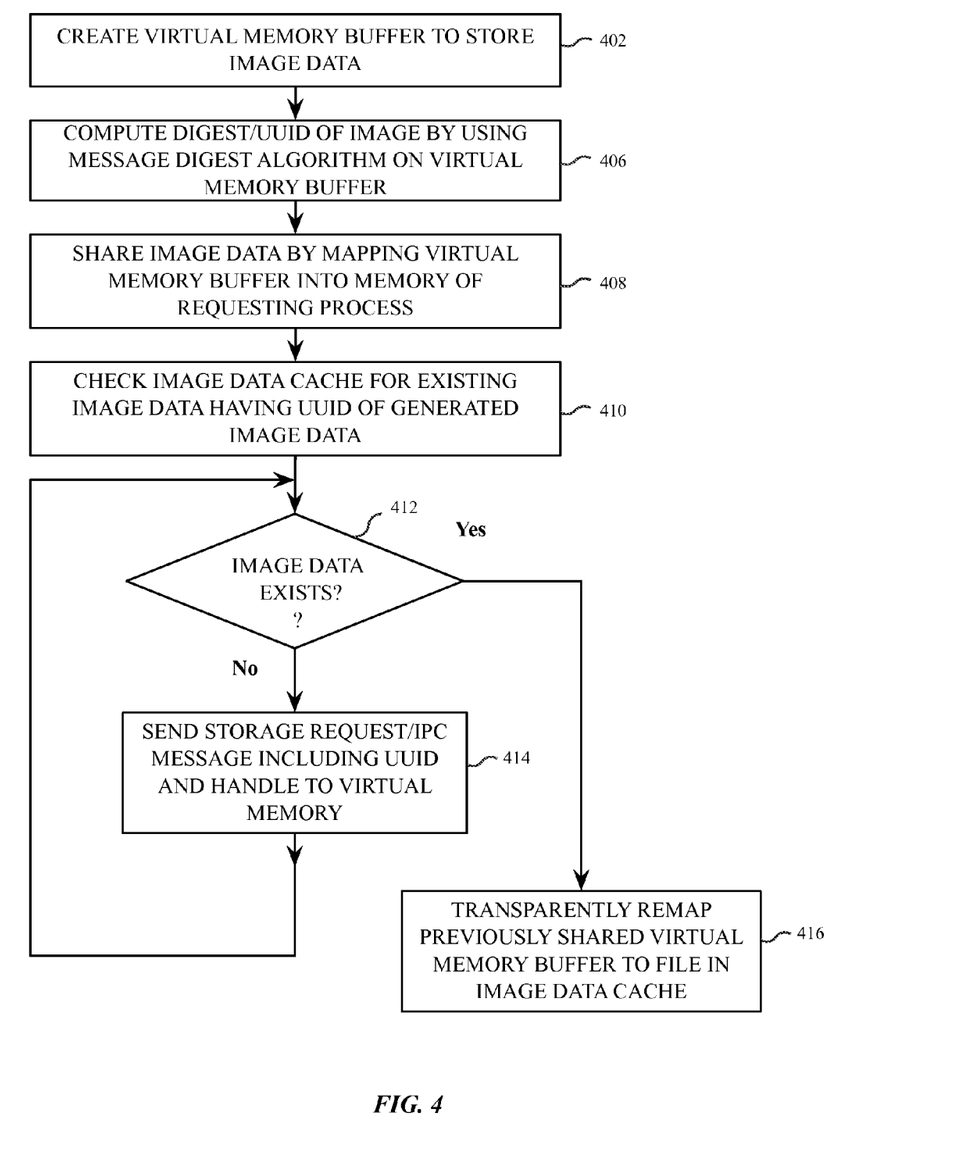
FIG. 4 is a flow diagram of additional logic to manage image data in the image data cache, according to an embodiment.

FIG. 4 is a flow diagram of additional logic to manage image data in the image data cache, according to an embodiment. In one embodiment, one or more agent processes associated with a user account may perform the logic shown in FIG. 4 to implement a general image data cache for composited UI components of the data processing system. An image data cache agent process can be used to perform general operations to allocate, map, and release memory used when creating and storing image data. The logic shown can also be used to supplement the logic of FIG. 3. In one embodiment, the icon services agent described herein performs operations associated with the image data cache agent in support of generating and caching icon image data.

As shown at block 402, memory to store generated image data can be allocated by creating a virtual memory buffer using the system virtual memory manager. The memory buffer can be an anonymous virtual memory buffer that is not associated with any particular file on the data processing system. After image data is copied, composited, rendered or otherwise received by the memory buffer, a digest of the memory buffer can be computed using a message digest algorithm, as shown at block 406, and a UUID for the image data can be derived from the digest. The newly created image may be shared with a requesting process by mapping the underlying virtual memory pages for the memory buffer containing the image into the process memory of the requesting process, as shown at block 408. The digest can also be shared with the requesting process, which can store the digest for subsequent retrieval of the image data file. In one embodiment, the memory is mapped to the requesting process as soon as the image data is ready for use, before the image data cache agent attempts to save the newly created image data buffer into the image data cache, to minimize the latency associated with accessing newly created composite image data.

In one embodiment, after the newly created image data is shared with the requesting process, the agent can check the image data cache for existing image data having the UUID of the generated image data, as shown at block 410. If a different user on the data processing system has previously generated image data that is identical to the newly created image data, then image data having the same UUID will already exist in the image data cache. As shown at block 412, if the image data exists, the agent process can transparently remap the previously shared virtual memory buffer to an address in the image data cache storing the existing image data. This mechanism enables multiple processes associated with multiple users to generate, cache and access generated image state stored in the image data cache while storing only one instance of each generated image. Only user accounts in which at least one process has generated a block of image data and indexed the digest of the image data (e.g., in a per user TOC) will have the UUID required to read the image data.

Returning to block 412, in the event the generated image data is new the agent process may send a storage request to a process authorized to access the image data cache, such as a daemon process (e.g., icon services daemon) associated with the image data cache. In one embodiment, the storage request is sent via an IPC message that includes the UUID of the image data and a handle, or other identifier with which the daemon may access the virtual memory pages storing the image data, as shown at block 414. The daemon can then map the virtual memory pages into process memory and store the image data into a location in the image data cache. Once the file exists, any existing anonymous memory buffers storing the image data can be remapped to the address in the image data cache storing the image data, as shown at block 416. The remapping is transparent in that the processes using the image data will not be aware that the remapping has occurred.

Figure 5:
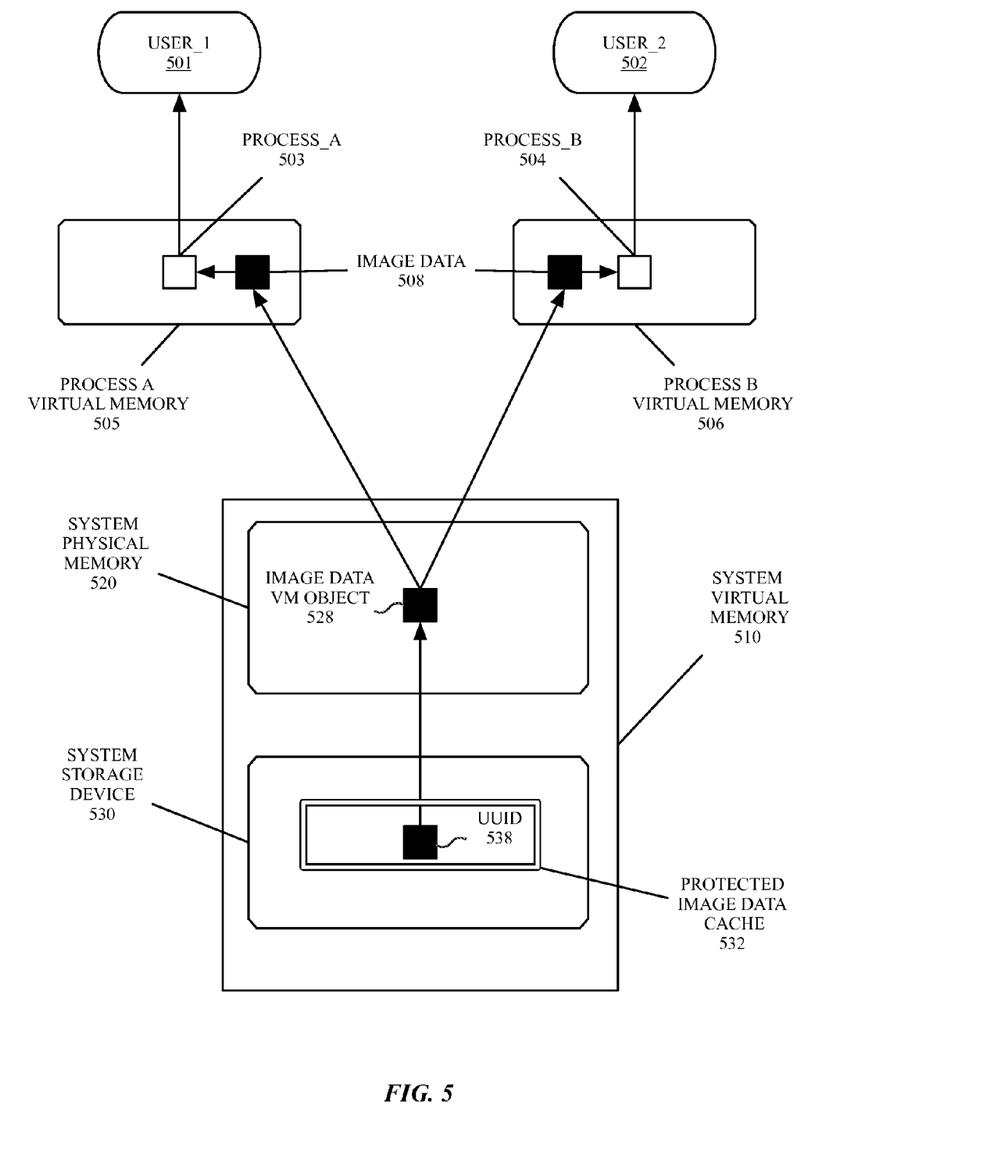
FIG. 5 is a block diagram illustrating memory mapping from a protected image data cache on a data processing system, according to an embodiment.

FIG. 5 is a block diagram illustrating memory mapping from a protected image data cache on a data processing system, according to an embodiment. Using system virtual memory 510, the UUID 538 of image data stored in the protected image data cache 532 can be mapped as an image data VM (virtual memory) object 528. The system virtual memory 510 includes the system physical memory 520 and at least one system storage device 530. Data on a system storage device 530 can be mapped into an address in system virtual memory 510 and paged into system physical memory 520 when is accessed.

In one embodiment, a single image data VM object 528 is used to provide image data to multiple processes associated with multiple user accounts. A first process (e.g., process_A 503) associated with a first user (e.g., user_1 501) and a second process (e.g., process_B 504) associated with a second user (e.g., user_2 504) can each make use of data in the protected image data cache 532 by accessing the image data using the UUID 538. Each process sees a separate view of virtual memory, such that process_A virtual memory 505 differs from process_B virtual memory 506. However, each process can access image data 17 508 by creating a memory mapped buffer using the UUID 538 of the image data. A buffer containing image data 508 can then be created in the process's view of virtual memory.

For example, when process_A 503 makes a first request to map image data via the image data UUID 538, the image data can be mapped into a newly created image data VM object 528. Upon a subsequent request by process_B 504 to access the image data using the UUID 538, the request can be serviced by mapping a buffer in process_B virtual memory 506 to the existing image data VM object 528. When the image data 508 is accessed, a file having the UUID 538 of the image data can be paged in to system physical memory 520 from the system storage device 530.

Figure 6:
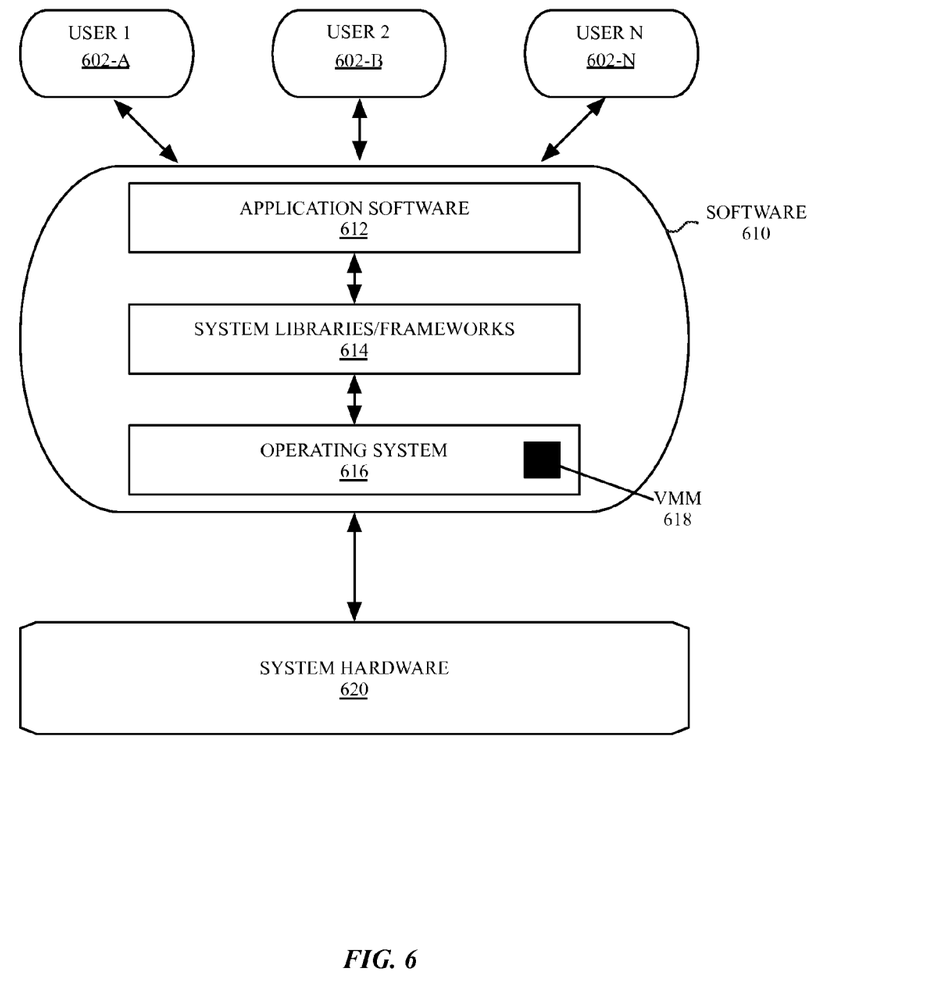
FIG. 6 is a block diagram of system hardware and software architecture for a multi-user data processing system, according to an embodiment.

FIG. 6 is a block diagram of system hardware and software architecture for a multi-user data processing system, according to an embodiment. The data processing system includes various software 610 and hardware 620 components configured to support multi-user data processing for 1 to N users (e.g., User 1 602-A, User 2, 602-B, User N 602-N). The users accesses application software 612 through a user interface provided by an operating system (OS) 616. Application software 612 can use system libraries or frameworks 614 as abstractions to functionality exposed by the core levels of the OS 616, including a virtual memory manager (VMM) 618.

Figure 7:
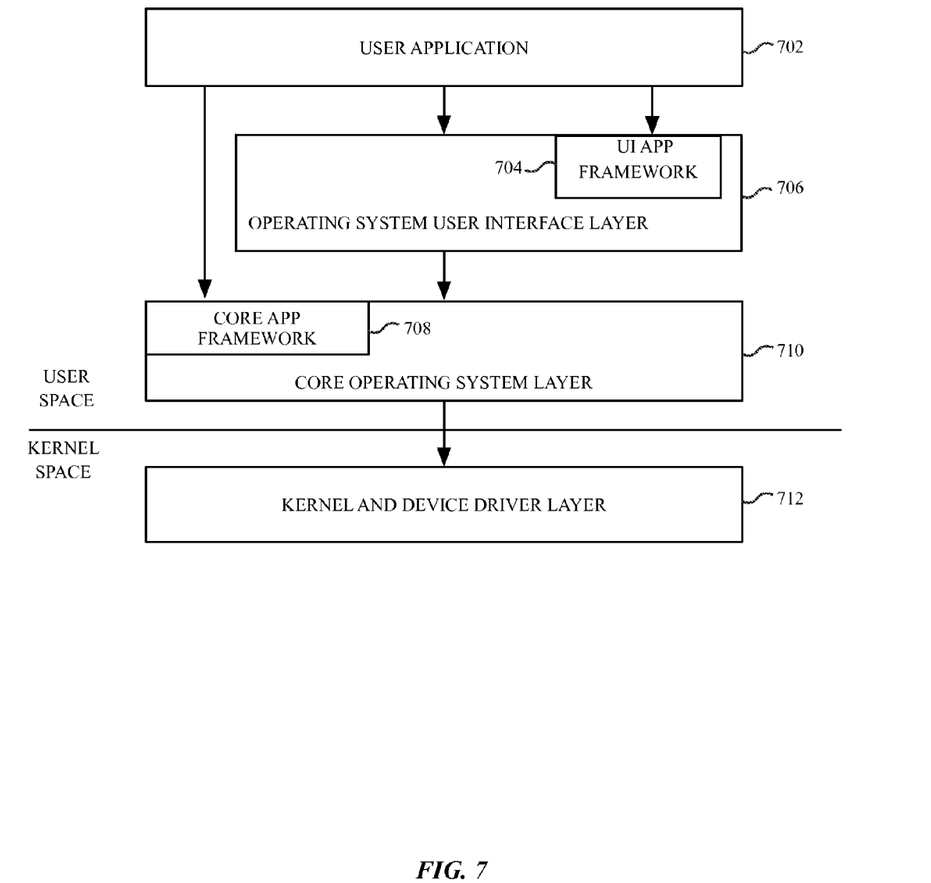
FIG. 7 is a block diagram of software architecture for use by a data processing system, according to an embodiment.

FIG. 7 shows software architecture for use by a data processing system, according to an embodiment. The various software components of the exemplary software architecture can be stored in a combination of volatile and non-volatile memory during the execution of the software components. When the components are not being executed, the components can be stored in non-volatile storage such as a magnetic hard drive or semiconductor memory (e.g., flash memory, etc.). The software components are illustrated with a division between user space and a kernel space. Although other arrangements are possible, user applications (e.g., user application 702), and some operating system components (e.g., operating system user interface layer 706, and core operating system layer 710) execute in user space. In kernel space, the operating system kernel and a set of device drivers operate in the kernel and device driver layer 712. The kernel and device driver layer 712 manage the underlying functionality of the overall operating system and provide a formalized and secure mechanism for user space software to access data processing system hardware.

A user interface (UI) application framework 704 provides a mechanism for the user application 702 to access UI services provided by the operating system (OS) UI layer 706. Underlying operating system functions that are not related to the user interface are performed in the core operating system layer 710. One or more data management frameworks, such as a core app framework 708 can be made available to a user application to facilitate access to operating system functions.

The exemplary user application 702 may be any one of a plurality of user applications, such as a web browser, a document viewer, a picture viewer, a movie player, a word processing or text editing application, an email application, or other applications known in the art. The user application 702 accesses instructions in an exemplary UI app framework 704 for creating and drawing graphical user interface objects such as icons, buttons, windows, dialogs, controls, menus, and other user interface elements. The UI application framework 704 also provides additional functionality including menu management, window management, and document management, as well as file open and save dialogs, drag-and-drop, and copy-and-paste handling.

The core operating system layer 710 contains operating system components that implement features including and related to application security, system configuration, graphics and media hardware acceleration, and directory services. Multiple application frameworks, including the core app framework 708, provide a set of APIs to enable a user application 702 to access core services that are essential to the application, but are not directly related to the user interface of the application. The core app framework 708 can facilitate an application's access to database services, credential and security services, backup services, data synchronization services, and other underlying functionality that may be useful to an application.

The core app framework 708, or equivalent application frameworks, can provide access to remote server based storage for functionality including synchronized document storage, key-value storage, and database services. Key-value storage allows a user application 702 to share small amounts of data such as user preferences or bookmarks among multiple instances of the user application 702 across multiple client devices. The user application 702 can also access server-based, multi-device database solutions via the core app framework 708.

Figure 8:
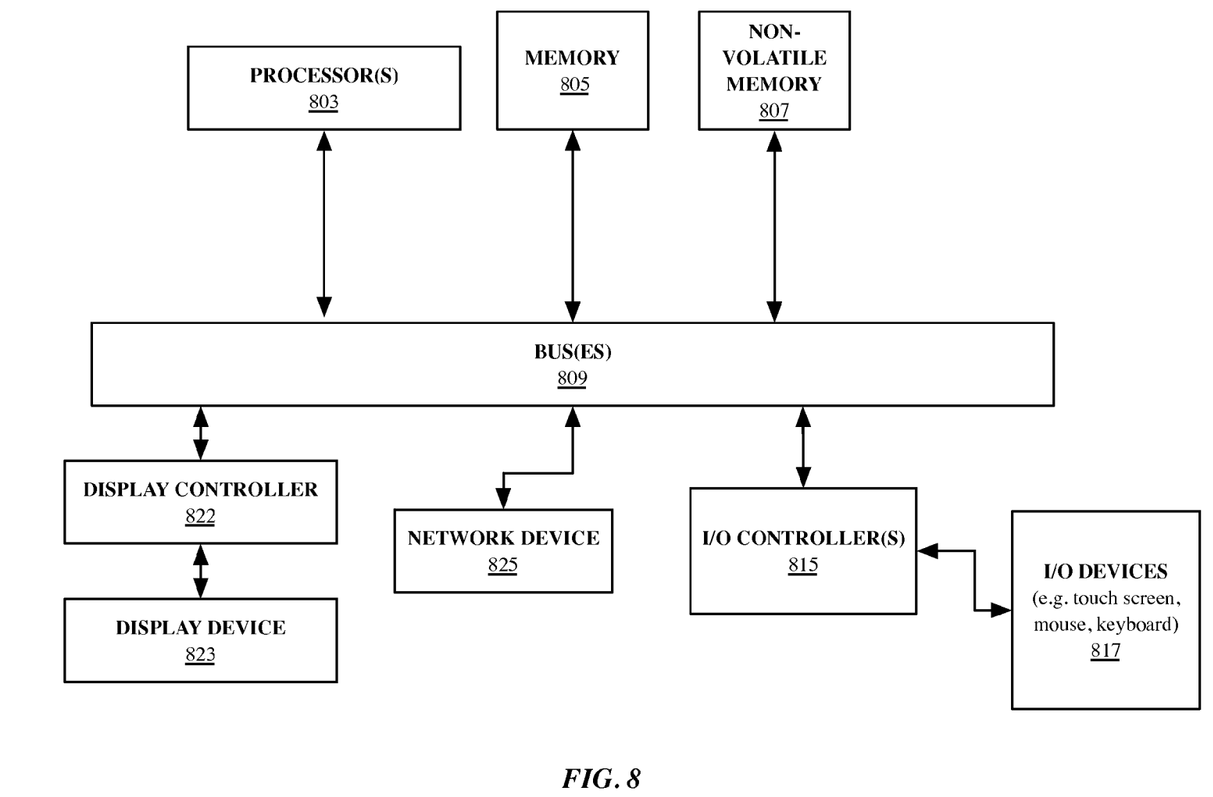
FIG. 8 is a block diagram of exemplary hardware for use in a data processing system, according to an embodiment.

The systems and methods described herein can be implemented in a variety of different data processing systems and devices, including general purpose computer systems, special purpose computer systems, or a hybrid of general purpose and special purpose computer systems. Exemplary data processing systems that can use any one of the methods described herein include desktop computers, a laptop computers, tablet computers, smart phones, cellular telephones, personal digital assistants (PDAs), embedded electronic devices, or consumer electronic devices. FIG. 8 shows one example of a typical data processing system hardware that may be used with the present embodiments. Note that while FIG. 8 illustrates the various components of a data processing system, such as a computer system, it is not intended to represent any particular architecture or manner of interconnecting the components as such details are not germane to the present invention. It will also be appreciated that other types of data processing systems that have fewer components than shown or more components than shown in FIG. 8 can also be used with the present invention.

As shown in FIG. 8, the data processing system includes one or more buses 809 that serve to interconnect the various components of the system. One or more processors 803 are coupled to the one or more buses 809 as is known in the art. Memory 805 may be DRAM or non-volatile RAM or may be flash memory or other types of memory. This memory is coupled to the one or more buses 809 using techniques known in the art. The data processing system can also include non-volatile memory 807 which may be a hard disk drive or a flash memory or a magnetic optical drive or magnetic memory or an optical drive or other types of memory systems which maintain data even after power is removed from the system. The non-volatile memory 807 and the memory 805 are both coupled to the one or more buses 809 using known interfaces and connection techniques. A display controller 811 is coupled to the one or more buses 809 in order to receive display data to be displayed on a display device 813 which can display any one of the user interface features or embodiments described herein. The display device 813 can include an integrated touch input to provide a touch screen. The data processing system can also include one or more input/output (I/O) controllers 815 which provide interfaces for one or more I/O devices, such as one or more mice, touch screens, touch pads, joysticks, and other input devices including those known in the art and output devices (e.g. speakers). The input/output devices 817 are coupled through one or more I/O controllers 815 as is known in the art.

While FIG. 8 shows that the non-volatile memory 807 and the memory 805 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 809 may include one or more bridges or controllers or adapters to interconnect between various buses. In one embodiment, the I/O controller 815 includes a USB adapter for controlling USB peripherals and can control an Ethernet port or a wireless transceiver or combination of wireless transceivers. It will be apparent from this description that aspects of the present invention may be embodied, at least in part, in software. That is, the techniques may be carried out in a data processing system in response to its processor executing a sequence of instructions contained in a memory such as the memory 805 or the non-volatile memory 807 or a combination of such memories that together may embody the machine-readable storage medium. In various embodiments, hardwired circuitry may be used in combination with software instructions to implement the present invention. Thus the techniques are not limited to any specific combination of hardware circuitry and software nor to any particular source for the instructions executed by the data processing system.

Disclosed herein are various embodiments of a system and method for securely sharing cached data between multiple users on a data processing system. In one embodiment, a method of caching image data for a user interface of a data processing system includes rendering the image data into memory of the data processing system, computing a digest of the image data, and storing the image data in a protected image data cache using a unique identifier based on the digest of the image data. In one embodiment, the method further includes receiving a request from a process associated with a first user account to generate image data and the rendering of the image data is performed response to the request. In one embodiment the image data is for display as a user interface element. In one embodiment the method further comprises sharing the rendered image data with the process for which the image data is requested. The process can then store the image data for later use and subsequently retrieve the image data from the protected image data cache using the stored digest of the image data. In one embodiment, any aspect of the method described herein may be incorporated in a non-transitory machine readable medium that stores instructions. The instructions, when executed by one or more processors, cause the one or more processors to perform operations to implement the methods described herein.

In one embodiment, a non-transitory machine readable storage medium stores instructions to perform operations comprising creating a virtual memory buffer to store generated image data, computing a digest of the generated image data stored in the virtual memory buffer, sharing the image data with a process in response to a request for the image data, checking an image data cache for image data having a unique identifier of the generated image data, and remapping the virtual memory buffer to a location in the image data cache associated with the unique identifier. In one embodiment the medium stores instructions to perform operations including creating an anonymous virtual memory buffer for sharing between multiple processes, computing a cryptographic hash of the virtual memory buffer storing the generated image data, and mapping the virtual memory buffer into memory of the process in response to the request for the image data.

In one embodiment, the medium stores instructions to perform operations including determining if a file associated with the unique identifier of the generated image data exists in a directory associated with the image data cache and sending a request to store the virtual memory buffer to a file in the image data cache if the file does not exist. The request can include the unique identifier of the generated imaged image data stored in the virtual memory buffer. In one embodiment, remapping the virtual memory buffer to the location in the image data cache associated with the unique identifier includes transparently remapping the virtual memory buffer to a file in the image data cache, the file having a filename including the unique identifier.

In one embodiment, a system comprises one or more processors coupled to memory, one or more storage devices to store a protected image data cache, and an operating system executing on the one or more processors, the operating system including a virtual memory system to map a location on the one or more storage devices to an address in the memory. A first process and a second process are configured to execute on the one or more processes via the operating system. The first process and the second process each access the same composited image data stored in the protected image data cache using a unique identifier derived from the image data. Access is provided at least in part by a mapping from a virtual memory system provided by the operating system. The virtual memory system is configured to map a location on the one or more storage devices to an address in the memory.

In one embodiment, the protected image data cache is a directory of a file system for the one or more storage devices on the data processing system and the directory is owned by a restricted user account with write access to the directory. In one embodiment the first process and the second process have read-only access to the directory but the first process and the second process cannot enumerate the contents of the directory. In one embodiment, the first process or the second process to access the composited image data from the protected image data cache by performing operations to cause the one or more processors to derive a key for the image data based on attributes of the image data, retrieve a stored digest of the image data using the key, derive a filename for the image data using the digest, and use the filename to cause the image data to be loaded into memory from a file in the protected image data cache, wherein the filename is a universally unique identifier (UUID) based on the digest of the image data and the digest of the image data is computed using a message digest algorithm. While the protected image data cache, in one embodiment, is a directory in a file system of the data processing system, other implementations are possible, such as a database or a binary blob.

Besides what is described herein, various modifications can be made to the disclosed embodiments and implementations without departing from their scope. Therefore, the illustrations and examples herein should be construed in an illustrative, and not a restrictive sense. The scope and spirit of the invention should be measured solely by reference to the claims that follow.

What is claimed is:

1. A non-transitory machine readable storage medium storing instructions which, when executed by one or more processors, cause the one or more processors to perform operations comprising:
   creating a memory buffer to store generated image data;
   computing a digest of the generated image data stored in the memory buffer;
   sharing the image data with a process in response to a request for the image data;
   checking an image data cache for image data having a unique identifier of the generated image data; and
   mapping the memory buffer to a location in the image data cache associated with the unique identifier.

2. The medium of claim 1 wherein creating the memory buffer includes creating an anonymous shared virtual memory buffer.

3. The medium of claim 1 wherein computing the digest of the generated image data includes computing a cryptographic hash of the memory buffer storing the generated image data.

4. The medium of claim 1 wherein sharing the image data with the process includes mapping the memory buffer to the process in response to the request for the image data.

5. The medium of claim 1 wherein checking the image data cache for image data having the unique identifier includes determining if a file associated with the unique identifier of the generated image data exists in a directory associated with the image data cache.

6. The medium of claim 1 further comprising sending a storage request to store the memory buffer to a file in the image data cache, the storage request including the unique identifier of the generated imaged image data stored in the memory buffer.

7. The medium of claim 1 wherein mapping the memory buffer to the location in the image data cache associated with the unique identifier includes transparently remapping the memory buffer to a file in the image data cache, the file having a filename including the unique identifier.

8. A system comprising:
   one or more processors coupled to memory;
   one or more storage devices to store a protected image data cache;
   an operating system executing on the one or more processors, the operating system including a virtual memory system to map a location on the one or more storage devices to an address in the memory;
   a first process to execute on the one or more processors, the first process to access composited image data stored in the protected image data cache using a unique identifier derived from the image data; and
   a second process to execute on the one or more processors, the second process to access the composited image data stored in the protected image data cache using the unique identifier derived from the image data, wherein the first process and the second process to access the composited image data via the virtual memory system.

9. The system of claim 8 wherein the protected image data cache is a directory of a file system for the one or more storage devices, the directory is owned by a restricted user account with write access to the directory, the first process and the second process have read-only access to the directory, and the first process and the second process cannot enumerate contents of the directory.

10. The system of claim 9 wherein the first process or the second process to access the composited image data from the protected image data cache by performing operations to cause the one or more processors to:

derive a key for the image data based on attributes of the image data;

retrieve a stored digest of the image data using the key;

derive a filename for the image data using the digest; and     use the filename to cause the image data to be loaded into memory from the protected image data cache, wherein the filename is a universally unique identifier (UUID) based on the digest of the image data and the digest of the image data is computed using a message digest algorithm.

11. A method of caching image data for a user interface of a data processing system, the method comprising:

rendering the image data into a buffer in memory of the data processing system;

computing a digest of the image data;

storing the digest; and storing the image data in a protected image data cache using a unique identifier derived from the digest of the image data.

12. The method of claim 11 further comprising receiving a request to generate image data from a user process executing on the data processing system, the user process associated with a first user account, and rendering the image data in response to the request.

13. The method of claim 12 further comprising sharing the image data with the user process.

14. The method of claim 11 further comprising retrieving image data from the protected image data cache using the digest of the image data.

15. The method of claim 11 further comprising creating the buffer in a virtual memory before rendering the image data.

16. The method of claim 15 wherein storing the image data in the protected image data cache includes mapping the virtual memory buffer to an address in the protected image data cache associated with the unique identifier.

17. The method of claim 16 wherein mapping the virtual memory buffer to the address in the protected image data cache includes mapping the virtual memory buffer to a file in the protected image data cache.

18. The method of claim 17 wherein the file in the protected image data cache has a filename derived from the unique identifier.

19. The method of claim 18 wherein the protected image data cache is a file system directory on a data storage device of the data processing system, file system configurations prevent a user process from enumerating contents of the directory, and the file in the protected image data cache is read-only to the user process.

* * * * *